(12) United States Patent
Oba et al.

(10) Patent No.: US 8,566,590 B2
(45) Date of Patent: Oct. 22, 2013

(54) ENCRYPTION INFORMATION TRANSMITTING TERMINAL

(75) Inventors: Yoshihiro Oba, Kawasaki (JP);
Yasuyuki Nishibayashi, Kawasaki (JP);
Mitsuru Kanda, Tokyo (JP); Takeshi Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/736,276

(22) PCT Filed: Nov. 26, 2009

(86) PCT No.: PCT/JP2009/069982
§ 371 (c)(1),
(2), (4) Date: Oct. 11, 2011

(87) PCT Pub. No.: WO2011/064868
PCT Pub. Date: Jun. 3, 2011

(65) Prior Publication Data
US 2012/0246473 A1 Sep. 27, 2012

(51) Int. Cl.
*H04L 29/06* (2006.01)
(52) U.S. Cl.
USPC .............................. 713/168; 726/4
(58) Field of Classification Search
USPC .............................. 713/168; 726/4
See application file for complete search history.

(56) References Cited

U.S. PATENT DOCUMENTS

2009/0098823 A1* 4/2009 Miyamoto ................. 455/9

FOREIGN PATENT DOCUMENTS

| JP | 2003-37587 | | 2/2003 |
|---|---|---|---|
| JP | 2003037587 | * | 2/2003 |
| JP | 2008-199524 | | 8/2008 |
| JP | 2008199524 | * | 8/2008 |
| JP | 2008-211329 | | 9/2008 |
| JP | 2008211329 | * | 9/2008 |
| JP | 2008-276457 | | 11/2008 |
| JP | 2008276457 | * | 11/2008 |

OTHER PUBLICATIONS

International Search Report for PCT/JP2009/069982, mailed Jan. 12, 2010.
ITRON, Enabling Cost-Effective Distribution Automation through Open-Standards Ami Communications, [online], ITRON White Paper, (Sep. 2009), pp. 1-9.
English-language translation of International Preliminary Report on Patentability for PCT/JP2009/069982.

* cited by examiner

*Primary Examiner* — Lisa Lewis
(74) *Attorney, Agent, or Firm* — Nixon & Vanderhye, P.C.

(57) ABSTRACT

The communication unit transmits and receives a communication message. The authentication processor performs an authentication process for establishing the network connection by transmitting and receiving an authentication message to and from an authentication server through the communication unit. The encryption information generator generates an encryption key shared with the authentication server when the authentication process is successfully completed. The first message generator generates a first communication message instructing the destination device to acquire the encryption key from the authentication server. The second message generator generates a second communication message including data to be transmitted to the destination device. The communication unit transmits the first communication message to the destination device, encrypts the second communication message with the encryption key, and transmits an encrypted second communication message to the destination device.

6 Claims, 9 Drawing Sheets

ENCRYPTION INFORMATION TRANSMITTING TERMINAL

CROSS REFERENCE TO RELATED APPLICATIONS

This application is the U.S. national phase of International Application No. PCT/JP2009/069982, filed 26 Nov. 2009, which designated the U.S., the entire contents of which is hereby incorporated by reference.

FIELD

The embodiment of the present invention relates to an encryption information transmitting terminal sharing an encryption key with a destination device without increasing communication traffic or processing volume, for example.

BACKGROUND

ANSI standard C12.22, which specifies a method for transmitting metering information, discloses a method in which a device for transmitting a communication message transmits the communication message after establishing routing information for determining which transfer device should relay the information.

Further, this standard specifies that an encryption key for encrypting a communication message should be previously shared among terminals, but does not specify a framework to dynamically set or update (re-key) the encryption key.

Accordingly, there is a problem that a malicious third party guesses the encryption key to analyze the encrypted communication message when the same encryption key is used for a long time to continue communication. Further, it is difficult for a meter device, which is generally formed as an embedded device having a low processing capacity, to simultaneously carry out a plurality of processes such as establishing the routing information and exchanging the encryption key, for example, while incorporating the encryption key into a device registration message for establishing the routing information.

Accordingly, the encryption key may be set by using the framework of an encryption key exchange protocol such as IKE (Internet Key Exchange protocol) and TLS (Transport Layer Security) after the communication route is established, which however leads to a problem that communication traffic and processing volume between the devices are excessively increased.

DETAILED DESCRIPTION

According to one embodiment, an encryption information transmitting terminal for communicating with a destination device through a network connection includes: a communication unit, an authentication processor, an encryption information generator, a first message generator, and a second message generator.

The communication unit transmits and receives a communication message.

The authentication processor performs an authentication process for establishing the network connection by transmitting and receiving an authentication message to and from an authentication server through the communication unit.

The encryption information generator generates an encryption key shared with the authentication server when the authentication process is successfully completed.

The first message generator generates a first communication message ordering the destination device to acquire the encryption key from the authentication server.

The second message generator generates a second communication message including data to be transmitted to the destination device.

The communication unit transmits the first communication message to the destination device, encrypts the second communication message with the encryption key, and transmits an encrypted second communication message to the destination device.

Hereinafter, an embodiment of the present invention will be described with reference to the accompanying drawings.

Figure 1:
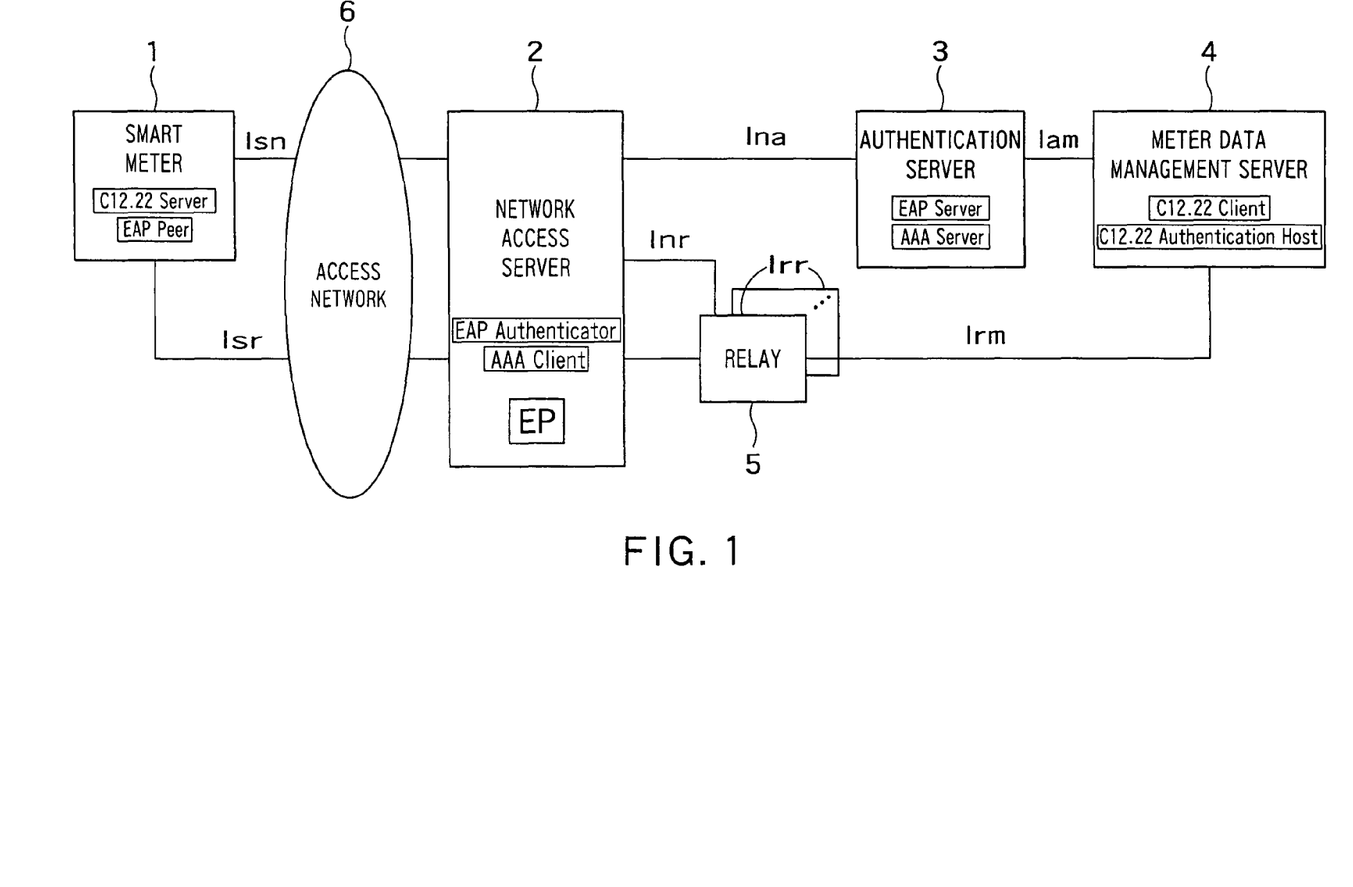
FIG. 1 is a block diagram of a network system including a smart meter (encryption information transmitting terminal) according to one embodiment.

FIG. 1 shows a schematic structure of a network system including an encryption information transmitting terminal according to the embodiment of the present invention. This network system includes: a smart meter 1 serving as an encryption information transmitting terminal; a network access server (NAS) 2; an authentication server (AS) 3; a Metering Data Management System (MDMS) server 4 serving as a destination device; and relays 5.

The smart meter 1 has the function of an ANSI C12.22 server and the function of an EAP Peer. Further, the smart meter 1 has the function of generating and storing data to be transmitted to the meter data management server 4. In the present embodiment, energy amount (such as electric energy consumption) of a customer premises equipment is measured at regular time intervals, and the integral value of the measured value is stored in a storage of the equipment as meter data (transmission data).

The meter data management server 4 corresponds to the destination device of the smart meter 1, and has the function of an ANSI C12.22 client and the function of an ANSI C12.22 authentication host. The meter data management server 4 manages the electric energy consumption of the customer premises equipment based on the meter data transmitted from the smart meter 1.

The authentication server 3 has the function of an Extensible Authentication Protocol (EAP) server associated with an authentication method and the function of an AAA (Authentication, Authorization, and Accounting) server.

The network access server 2 has the function of an EAP authenticator (Extensible Authentication Protocol Authenticator) and the function of an AAA client. The network access server 2 relays an EAP message between the smart meter 1 and the authentication server 3 by using the function of the EAP authenticator. The EAP message can be transferred between the smart meter 1 and the authentication server 3 by using a PANA (Protocol for carrying Authentication for Network Access), for example. In this case, the smart meter 1 serves as a PANA client. Further, the network access server 2 transfers the EAP message to the authentication server 3 by using the function of the AAA client in accordance with an AAA (Authentication, Authorization, and Accounting) protocol such as RADIUS (Remote Authentication Dial-In User Service) or Diameter.

In the present embodiment, the PANA is used to transfer the EAP message, and the network access server 2 has two functions of: an PAA (PANA Authentication Agent) having the function of an EAP authenticator; and an EP (Enforcement Point) carrying out access control on a packet basis over the smart meter 1 authenticated by using the PANA.

The relays 5 is formed of 0 or more ANSI C12.22 relays and an ANSI C12.22 master relay connected in multiple stages. Generally, when viewing from the smart meter 1 having the function of an ANSI C12.22 server, the master relay corresponds to the meter data management server 4, which is the relay device in the last stage. In the present embodiment, the relay function of the meter data management server 4 in the last stage is incorporated into the relays 5 as the master relay, and the meter data management server 4 is connected to the master relay. The smart meter 1 is connected to the first relay in the multiple stages. Note that the smart meter 1 can be connected to a plurality of relays at the same time.

An access network 6 is a network between the smart meter 1 and the network access server 2, and is a PAN (Personal Area Network) established based on IEEE802.15.4 standard, for example. The smart meter 1 which is not authenticated is permitted to access the access network 6 in an extremely limited way due to the access control by the EP of the network access server. For example, the smart meter 1 which is not authenticated is permitted to transmit and receive a network access authentication message, and is further permitted to transmit and receive an ARP message, IPv4 Neighbor Discovery message, DHCP (Dynamic Host Configuration Protocol) message, PANA message, etc. when the network access authentication is established by using a protocol of layer 3 (L3) or greater. For example, the smart meter 1 which is not authenticated can acquire an IP address by communicating with a DHCP server (not shown) included in the access network 6 in accordance with the DHCP (note that the PANA is a protocol operating on UDP, TCP, etc., and thus the IP address should be previously acquired when performing the PANA authentication. It is also possible to previously assign a static IP address to the smart meter 1).

In FIG. 1, Isn, Isr, Ina, Inr, Irr, Irm, and Iam represent communication interfaces respectively.

The interface Inr is an interface between the network access server 2 and the relay connected to the smart meter 1.

The interface Isn is an interface between the smart meter 1 and the network access server 2. A packet or frame based on a protocol such as PANA, IEEE 802.1x, PKMv2, IKEv2, etc. is transmitted and received through the interface Isn. When the protocol on the interface Isn is a data link layer protocol, the smart meter 1 is not required to have an IP address. Note that the present embodiment will be explained based on an example in which the PANA is used as a protocol on the interface Isn as stated above.

The interface Isr is an interface between the smart meter 1 and the network access server 2, the interface Irr is an interface between the relays (including the master relay), and the interface Irm is an interface between the master relay and the meter data management server 4, through each of which a frame or packet based on an ANSI C12.22 protocol is transmitted and received.

The interface Ina is an interface between the network access server 2 and the authentication server 3, through which a frame or packet based on an AAA protocol is transmitted and received as stated above.

The network access server 2 and the authentication server 3 may be incorporated into the same device. The network access server 2 and the relay connected to the smart meter 1 may be incorporated into the same device. The master relay and the meter data management server 4 may be incorporated into the same device. The authentication server 3 and the meter data management server 4 may be incorporated into the same device. The PANA authentication agent (PAA) and the enforcement point (EP) included in the network access server 2 may be incorporated into the same device or may be different devices. The enforcement point (EP) may be the same node as that of the relay or the master relay. Further, there may be a plurality of enforcement points (EP).

In the present embodiment, it is desirable that the network access server 2 and the relay or the master relay are incorporated into the same device, and that the authentication server 3 and the meter data management server 4 are incorporated into the same device. In this case, the interfaces Inr and Iam shown in FIG. 1 can serve as APIs in the same device, which leads to easy implementation.

Note that an access server which is different from that of FIG. 1 may be further used to perform the network access authentication to the access network 6. For example, when the access network 6 is a wireless LAN (Local Area Network) and has an access point serving as a wireless LAN authentication server, access authentication to the Local Area Network is required in addition to the authentication to the network access server of FIG. 1.

Figure 2:
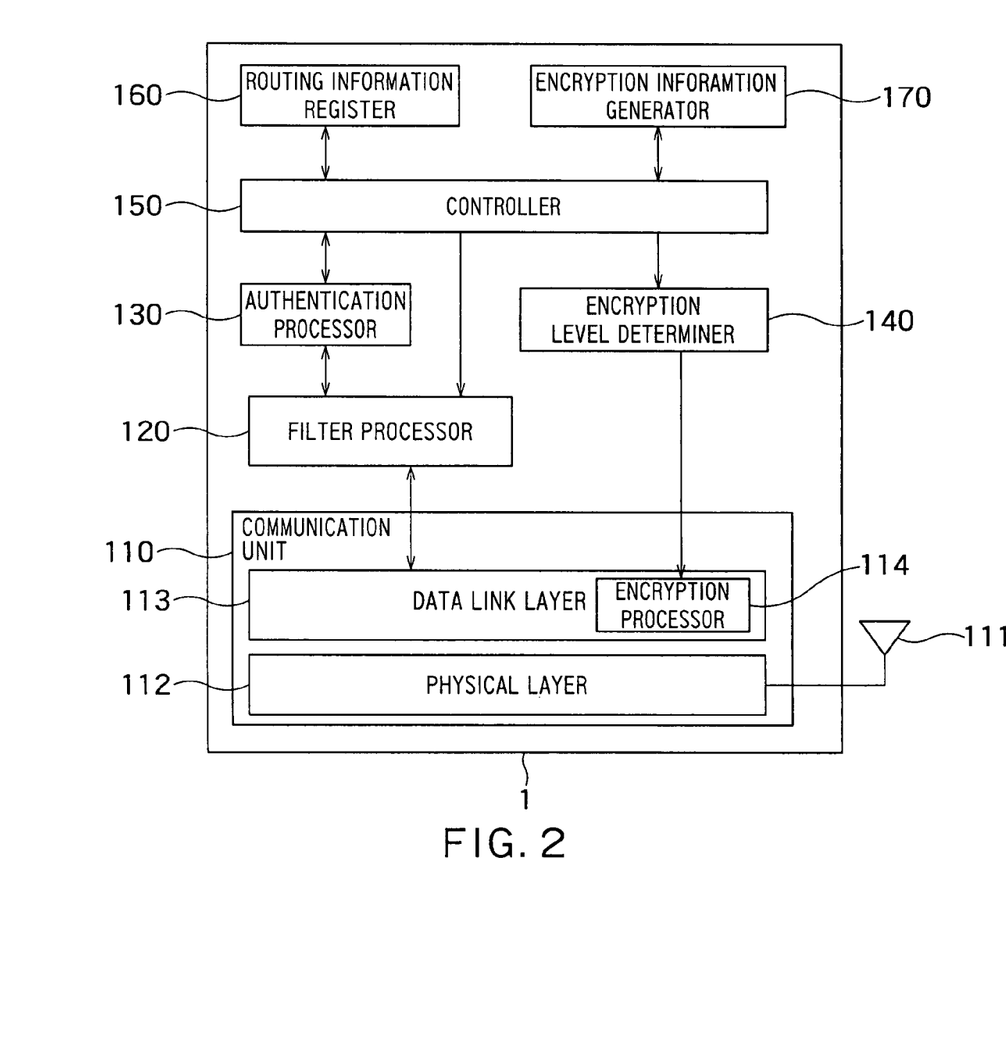
FIG. 2 is a block diagram showing the structure of the smart meter.

FIG. 2 shows a schematic structure of the smart meter 1.

The smart meter 1 includes: a communication unit 110; a filter processor 120; an authentication processor 130; an encryption level determiner 140; a controller (second message generator) 150; a routing information register (first message generator) 160; and an encryption information generator 170.

The communication unit 110, which is provided to transmit and receive a communication message, includes: an antenna 111; a physical layer 112; and a data link layer 113. The communication unit 110 performs communication in accordance with the steps under IEEE802.15.4 standard. The data link layer 113 includes an encryption processor 114 for encrypting a communication message by using a common key (encryption key).

The filter processor 120 performs packet filtering on a communication message concerning an IP (Internet Protocol). Based on the instruction from the controller 150, the filter processor 120 changes the messages permitted to pass through the communication unit 110. For example, before the authentication is completed, the filter processor 120 permits the passage of only an ARP (Address Resolution Protocol) message, PANA message, DHCP message, and IPv6 Neighbor Discovery message. Each of these messages corresponds to a predetermined communication message required for the authentication process in the one embodiment. After the authentication is completed, the passage of every communication message or at least first and second communication messages (explained later) of the one embodiment is permitted.

The authentication processor 130 carries out an authentication process to connect its own terminal (smart meter 1) to the network. The authentication processor 130 starts the PANA authentication to the network access server 2, and transmits and receives the EAP message to and from the authentication server 3 through the network access server 2. Further, the authentication processor 130 notifies the controller 150 of authentication phase information showing whether or not the authentication is completed. In the authentication process, user information which is inputted by a user or previously stored, for example, is transmitted to the authentication server 3 to acquire authentication.

The authentication processor 130 judges that the authentication is completed when its own terminal is permitted to connect to the network (the authentication is successfully completed) and the encryption information generator 170 completes setting an encryption key, and judges that the authentication is not completed when its own terminal is not permitted to connect to the network and/or when the encryption information generator 170 does not complete setting an encryption key.

The encryption information generator 170 generates and sets an encryption key when the authentication in the authentication processor 130 is successfully completed. The encryption key to be generated includes: an SMK-HH (SMK for hop by hop protection), which is an encryption key used in the communication between the smart meter 1 and the relay connected (adjacent) to the smart meter 1; and an SMK-EE (SMK for End-to-End protection), which is an encryption key used in the communication between the smart meter 1 and the meter data management server 4. The encryption information generator 170 sets these encryption keys in the encryption processor 114. As will be explained later, the authentication server 3 similarly generates the encryption keys (SKE-EE and SKE-HH) based on the algorithm as in the smart meter 1, and stores the encryption keys in relation to the device information (device identifier, for example) of the smart meter 1.

The encryption processor 114 encrypts (encodes) a message to be transmitted with the encryption key. The encryption key to be used may be specified by the controller 150 or may be determined by the encryption processor 114 itself by judging the kind of the message etc. Further, the encryption processor 114 decrypts (decodes) a received message with an applicable encryption key. The encryption key to be used in the decryption may be determined by transmitting an inquiry to the controller 150 or may be determined by the encryption processor 114 itself based on the kind of the message etc.

The encryption level determiner 140 determines the encryption level in the encryption processor 114 based on the instruction from the controller 150, and instructs the encryption processor 114 about the encryption level. Under IEEE802.15.4 standard, a plurality of security and encryption levels are specified. For example, unencrypted data messages can be transmitted and received when the security level (encryption level) is a minimum level, and only encrypted data messages can be transmitted and received when the security level is a normal level. The normal level is further classified corresponding to the kinds of encryption algorithm.

Based on the authentication phase information notified by the authentication processor 130, the controller 150 instructs the filter processor 120 to change the messages to be permitted the passage, and instructs the encryption level determiner 140 to change the encryption level. For example, the controller 150 instructs the filter processor 120 to permit the passage of only specific messages required for the authentication process before the authentication is completed, and to permit the passage of every communication message or at least the first and second communication messages and their response messages after the authentication is completed. Further, the controller 150 instructs the encryption level determiner 140 to set the encryption level at a minimum level (without encryption, for example) before the authentication is completed, and to set the encryption level at a normal level (with encryption by using the above SKE-EE or SKE-HH, for example) after the authentication is completed.

The routing information register 160 establishes and stores routing information to the meter data management server 4 in accordance with the steps under ANSI C12.22 standard. For example, the routing information register 160 performs device registration in the relay and the meter data management server 4 by transmitting a communication message including the device information (device identifier, for example) of its own device, and registers the routing information in the meter data management server 4. The routing information register 160 may acquire and register the routing information by broadcast-transmitting the communication message to receive a response message from the meter data management server 4 or may previously store the routing information therein.

Before the routing information register 160 establishes the routing information, the controller 150 instructs the authentication processor 130 to perform the authentication for the network connection and exchange the encryption key between the smart meter 1 and the authentication server 3. After the authentication is successfully completed, the controller 150 instructs the routing information register 160 to register (establish) the routing information, and the communication message concerning the device information of the smart meter 1 is notified to the destination, device (meter data management server 4) through the relays in accordance with normal steps under ANSI C12.22. Note that the meter data management server 4 receives the communication message and acquires an encryption key (SMK-EE) corresponding to the device information from the authentication server 3 as will be explained later.

Figure 3:
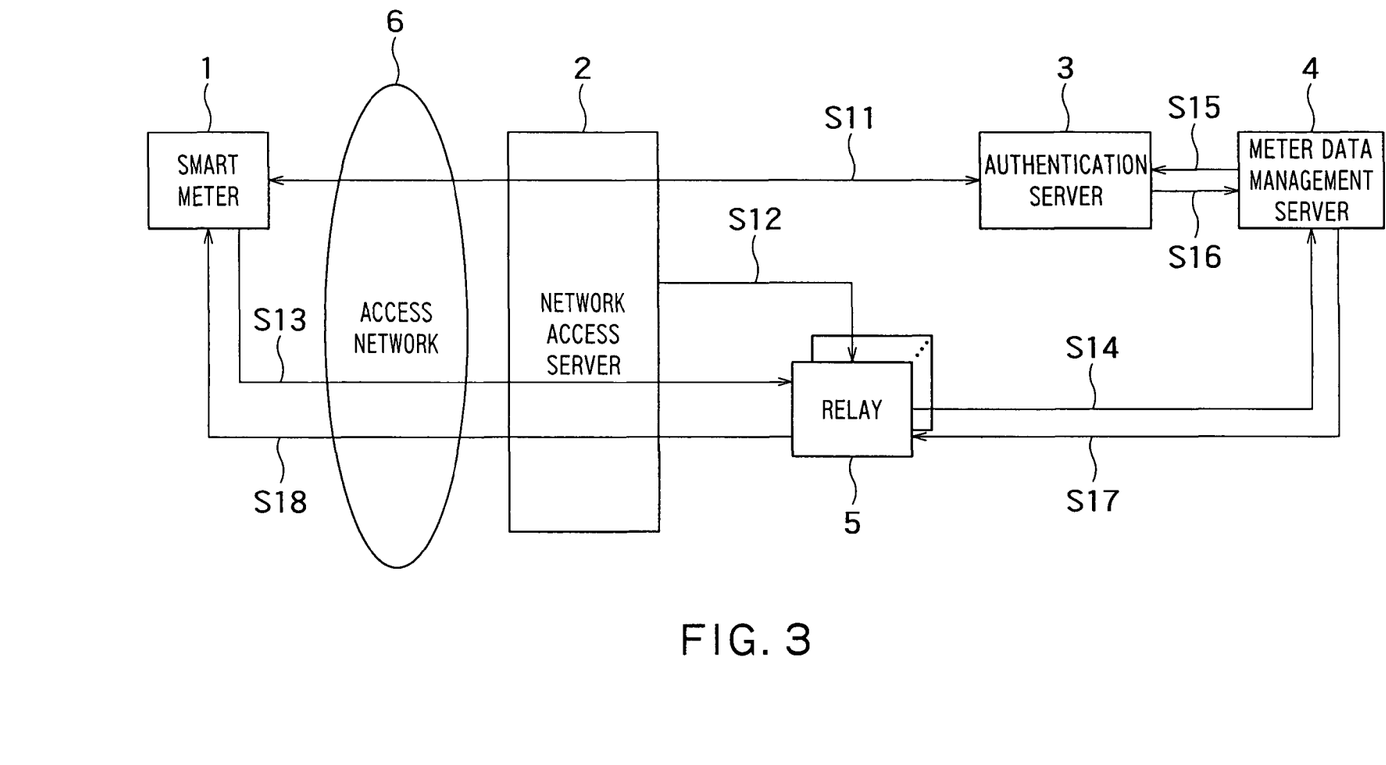
FIG. 3 is a diagram showing peer authentication and a key setting sequence performed in the network system of FIG. 1.

FIG. 3 shows peer authentication and a key setting sequence performed in the network system of FIG. 1 based on a key management method of the present embodiment.

(Step S11) An authentication message is transmitted and received between the smart meter 1 and the authentication server through the network access server 2 to perform EAP authentication. Before the EAP authentication is successfully completed, the network access server 2 blocks ANSI C12.22 messages concerning the smart meter 1 (access control) to prevent the messages from being transmitted to the external network (network having relays, for example).

When the authentication is successfully completed, the authentication server 3 and the smart meter 1 generate common encryption keys. Concretely, the encryption keys to be generated are: the SMK-HH (SMK for hop by hop protection) used in the communication between an ANSI C12.22 server (smart meter 1) and an ANSI C12.22 relay; and the SMK-EE (SMK for End-to-End protection) used in the communication between the ANSI C12.22 server (smart meter 1) and an ANSI C12.22 client (meter data management server 4). Further, an MSK (Master Session Key) may be generated to be used in the communication only in the access network 6. Note that each encryption key may be generated by one of the smart meter 1 and the authentication server 3 and securely transmitted to the other. After the authentication is completed, the network access server 2 set the EP (enforcement point) to cancel the block (access control) of the ANSI C12.22 messages concerning the smart meter 1.

Hereinafter, how to generate the encryption keys (SMK-HH and SMK-EE) will be explained in detail.

The EAP has the function of exporting, to an external protocol, two kinds of master keys consisting of an MSK (Master Session Key) and an EMSK (Extended Master Session Key) generated by an EAP authentication method.

The MSK is used to generate an encryption key for encrypting a data packet in the access network. Usage-Specific Root Keys (USRK) are derived from the EMSK.

Figure 4:
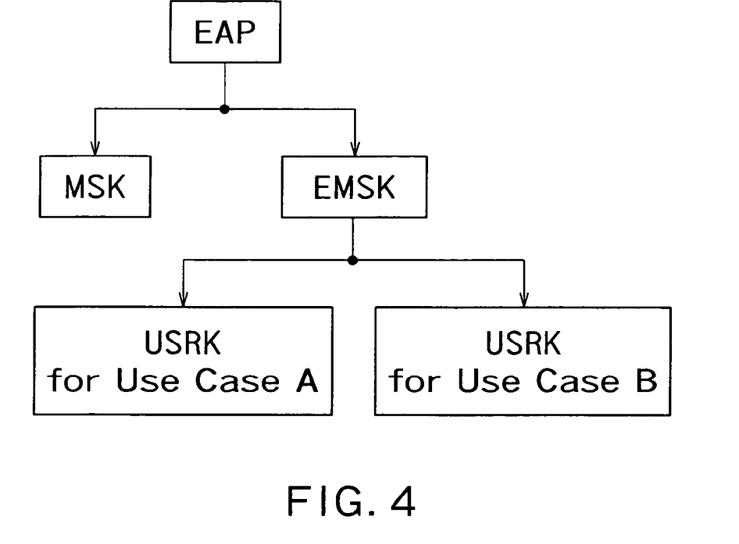
FIG. 4 is a diagram showing the key hierarchy of an EMSK.

FIG. 4 shows the key hierarchy of the MSK, EMSK, and USRKs.

The MSK is used in the protocols under IEEE 802.11, IEEE 802.16e, PANA, and IKEv2, for example.

The USRK is used as a DSRK (Domain-Specific Root Key) and a DSUSRK (Domain-Specific Usage-Specific Root Key), for example. Here, the lifetime of the USRK is equal to or shorter than the lifetime of the EMSK, and the USRK and its offspring keys are updated when the EMSK is updated by the re-authentication of the EAP.

An application master key SMMK (Smart Meter Master Key) of the smart meter 1 is defined as a USRK derived from the EMSK. The SMMK is used as a master key to derive ANSI C12.22 encryption keys (SMK-HH and SMK-EE).

Figure 5:
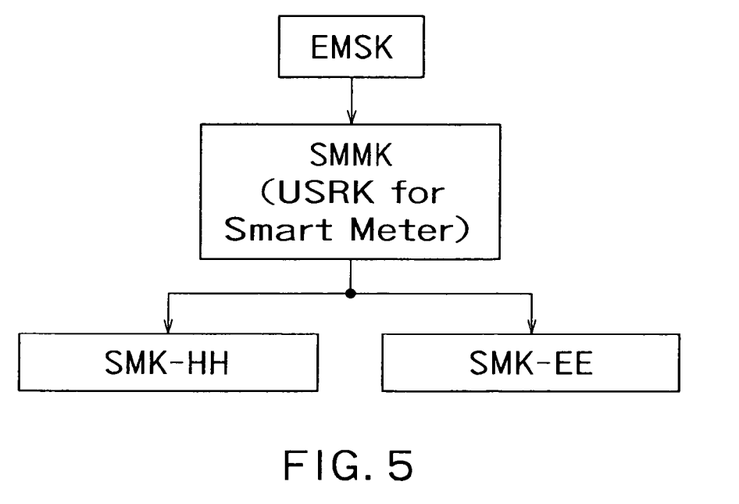
FIG. 5 is a diagram showing the key hierarchy of an SMMK.

FIG. 5 shows the key hierarchy of the SMK-HH and SMK-EE. The SMK-HH and the SMK-EE are derived from one master key SMMK (Smart-Meter Master Key). The SMMK is derived from the EMSK as a USRK.

The SMK-HH is an encryption key used to encrypt the ANSI C12.22 message and ensure the integrity of the message when Calling-ApTitle and Called-ApTitle of the ANSI C12.22 message are the ANSI C12.22 server (smart meter 1) and the ANSI C12.22 relay respectively, or the ANSI C12.22 relay and the ANSI C12.22 server (smart meter 1) respectively. Note that the Calling-ApTitle and the Called-ApTitle, each of which shows a device identifier in the application layer specified by the ANSI C12.22 protocol, correspond to a source device identifier and a destination device identifier respectively. Each of the Calling-ApTitle and the Called-ApTitle is information corresponding to an IP address serving as a device identifier in a network layer.

The SMK-EE is an encryption key used to encrypt the ANSI C12.22 message and ensure the integrity of the message when the Calling-ApTitle and the Called-ApTitle are the ANSI C12.22 server (smart meter 1) and the ANSI C12.22 client (meter data management server 4) respectively, or the ANSI C12.22 client (meter data management server 4) and the ANSI C12.22 server (smart meter 1) respectively.

Here, the SMMK is derived from the following algorithm.

SMMK=KDF (EMSK, key label|"¥ 0"|optional data|length)

Here, "key label" is the label of a key common to every the SMMK, and a position ID such as "SMMK@ietf.Org" is used for the label. Note that optional data is NULL (0×00), and length is 64.

The SMK-HH is derived from the following algorithm.

SMK-HH=KDF (SMMK, "SMK-SM-CTR"|" ¥ 0"|optional data|length)

optional data: ANSI C12.21 Relay Ap-Title|ANSI C12.21 key-id
length=16

The SMK-EE is derived from the following algorithm.

SMK-EE=SMK-SM-MDMS SERVER(Smart Meter Key between Smarter Meter and MDMS SERVER)=KDF (SMMK, "SMK-SM-MDMS SERVER"|"¥ 0"|optional data|length)

optional data: ANSI C12.21 Client Ap-Title|ANSI C12.21 key-id
length=16

As to the definition of KDF (Key Derivation Function), see URL http://www.ietf.org/rfc/rfc5247.txt. (AbobaB., SimonD., EronenP. Extensible Authentication Protocol (EAP) Key Management Framework. (Online) Aug. 2008), for example.

Note that the terminal sets and updates each encryption key dynamically and safely in Step S11, which will be explained in detail later.

(Step S12) The network access server 2 transmits the SMK-HH to the relay connected to the smart meter 1.

(Step S13). The smart meter 1 transmits an Authenticated C12.22 Registration request to the meter data management server 4 through 0 or more relays and the master relay. That is, the smart meter 1 generates a device registration request including device information (device identifier etc.) of its own device in accordance with ANSI C12.22, encrypts the device registration request with the SMK-HH, and transmits the message. This message includes an instruction to acquire the SMK-HH, and corresponds to the first communication message of the one embodiment. Note that the instruction message to acquire the SMK-HH may be defined separately from the device registration message, and treated as the first communication message. For example, when the device registration (routing information registration) is completed and the key is updated while the device registration is effective in the meter data management server 4, the instruction to acquire the SMK-HH can be transmitted by the message separately defined. The device registration request or the first communication message is generated by the routing information register 160 including the first message generator of the one embodiment.

(Step S14) The encrypted device registration request received by the relay is decrypted with the SMK-HH and relayed to the master. When the master relay receives the encrypted device registration request directly from the smart meter 1, the encrypted device registration request is decrypted directly by the master relay. Based on the decrypted device registration request, the master relay generates an ANSI C12.22 Registration Notification request including the device identifier of the smart meter 1, and transmits the request to the meter data management server 4.

The communication between the relays may be performed based on a predetermine encryption method. Note that the relays 5 also performs the device registration (routing information registration) of the smart meter 1 based on the device registration request.

(Step S15) Based on the device identifier of the smart meter 1 included in the registration notification request, the meter data management server 4 transmits, to the authentication server 3, a request to acquire the SMK-EE corresponding the smart meter 1.

(Step S16) In accordance with the acquisition request from the meter data management server 4, the authentication server 3 securely transmits, to the meter data management server 4, the SMK-EE corresponding to the smart meter 1 by a predetermined method.

(Step S17) The meter data management server 4 receives the SMK-EE and transmits an Authenticated C12.22 Registration Notification response to the master relay.

(Step S18) The master relay transmits an Authenticated C12.22 Registration response to the smart meter 1 through 0 or more relays. When the message is transmitted to the smart meter 1 from the relay connected to the smart meter 1, the message is encrypted with the SMK-HH.

(Step S19) As stated above, the SMK-EE is shared between the smart meter 1 and the meter data management server 4, and thus the data communication between the smart meter 1 and the meter data management server 4 can be safely performed by using the SMK-EE. For example, the controller 150 of the smart meter 1 encrypts meter data with the SMK-EE and transmits the communication message (second communication message) including the encrypted meter data to the meter data management server 4 through 0 or more relays and the master relay. The controller 150 includes the second message generator for generating the second communication message of the one embodiment.

Figure 6:
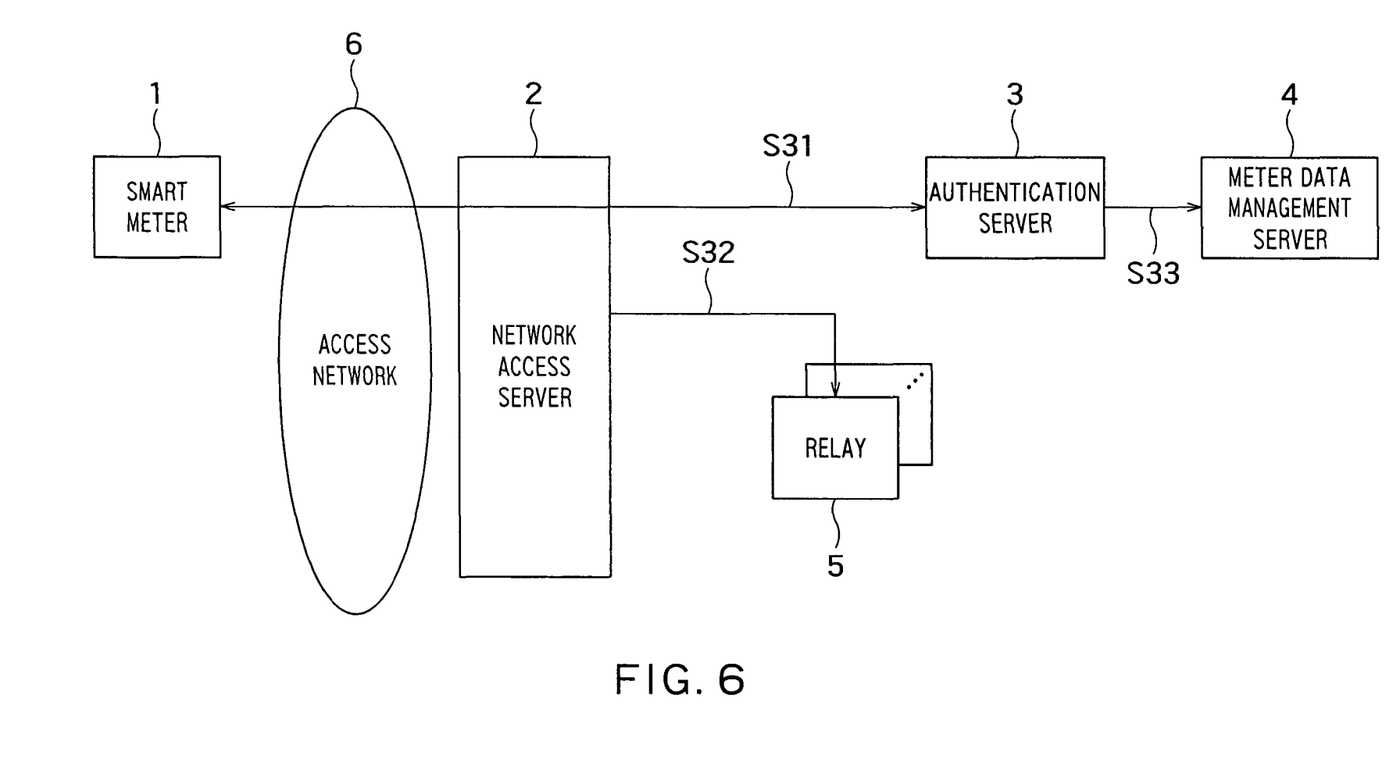
FIG. 6 is a diagram showing a key deletion sequence performed in the network system of FIG. 1.

FIG. 6 shows a key deletion sequence performed in the network system of FIG. 1 based on a key management method of the present embodiment.

(Step S31) The smart meter 1 cuts off the connection to the access network 6, which is achieved by transmitting a request for terminating the PANA authentication to the network access server 2, for example. The network access server 2 receives the termination request, invalidates the authentication, and sets the EP so that ANSI C12.22 messages concerning the smart meter 1 are blocked. Further, the network access server 2 notifies the authentication server 3 that the authentication of the smart meter 1 is invalidated.

(Step S32) The network access server 2 transmits a deletion request of the SMK-HH to the master relay or the relay connected to the smart meter 1. The relay or the master relay receives the deletion request, and deletes the SMK-HH stored therein.

(Step S33) The authentication server 3 notified that the authentication of the smart meter 1 is invalidated transmits, to the meter data management server 4, a deletion request of the SMK-EE corresponding to the smart meter 1. The meter data management server 4 receives the deletion request, and deletes the SMK-EE corresponding to the smart meter 1.

Further, each of the smart meter 1 and the authentication server 3 deletes the SMK-EE and the SMK-HH stored therein.

As stated above, in the present embodiment, an ANSI C12.22 key can be updated (Re-keyed) without changing any ANSI C12.22 protocol. Further, not only the encryption key (SMK-EE) between the ANSI C12.22 server (smart meter 1) and the ANSI C12.22 client (meter data management server 4) but also the encryption key (SMK-HH) between the ANSI C12.22 server (smart meter 1) and the ANSI C12.22 relay adjacent thereto can be updated. Further, the same protocol (EAP) is used to perform the network access authentication, authentication for updating the ANSI C12.22 key, and key management, by which the code size of software required for the smart meter 1 can be kept small compared to the case where different protocols are used to perform the network access authentication, authentication for updating the ANSI C12.22 key, and key management.

In other words, in the present embodiment, before the routing information register 160 establishes a communication route with notification of device information, network access authentication and encryption information are transmitted to the authentication server 3 and then a communication message for establishing the communication route is transmitted to instruct the meter data management server 4 to acquire an encryption key from the authentication server 3, by which communication traffic and processing volume between the smart meter 1 and the meter data management server 4 can be reduced. When the smart meter 1 is installed by an installation technician of an electric power provider etc., communication traffic and processing volume can be reduced by exchanging encryption information between the smart meter 1 and an authentication server while performing an authentication process for network connection, and by instructing the meter data management server 4 to acquire an encryption key from the authentication server 3 when establishing a communication route through which measured metering information is actually transmitted.

Note that the present embodiment can be used in smart grid communication to safely perform the communication between the smart meter 1 and an advanced metering infrastructure (AMI) corresponding to the meter data management server 4.

Hereinafter, Step S11 of FIG. 3 for setting and updating the encryption key dynamically and safely will be explained in detail.

The authentication steps in the smart meter 1 will be explained by using the flow chart shown in FIG. 7. Note that when the smart meter 1 is started (or restarted), the encryption level in the encryption processor 114 is set at a minimum level (without encryption), and the filter processor 120 performs filtering setting to permit the passage of only an ARP message, PANA message, DHCP message, and IPv6 Neighbor Discovery message.

(Step S101) The smart meter 1 is connected to the access network 6 without encryption (unsecured join). Concretely, the smart meter 1 carries out an Association Request command to a DHCP server (not shown) in the access network without encrypting a MAC layer.

(Step S102) The smart meter 1 acquires an IP address from the DHCP server. A link local address, for example, can be used as the IP address. Further, the smart meter 1 discovers the network access server 2. The DHCP can be used to discover the network access server.

(Step S103) A PANA session is started between the smart meter 1 and the network access server 2. Concretely, the session is started when the smart meter 1 (authentication processor 130) transmits a PANA-Client-Initiation message to the network access server 2 or after the smart meter 1 receives a PANA-Auth-Request message having an ON-state S flag from the network access server 2.

Note that due to the filtering setting by the filter processor 120, the passage of only specific messages are permitted.

(Step S104) Whether the authentication by the authentication server 3 is successfully completed is judged. The flow proceeds to Step S105 when the authentication is successfully completed, and proceeds to the end when the authentication process is failed.

(Step S105) When the authentication is successfully completed, the encryption information generator 170 generates the encryption keys (SMK-EE and SMK-HH) and sets the keys in the encryption processor 114.

(Step S106) The encryption level (security level) in the encryption processor 114 is set at a normal level, by which only encrypted data messages or at least the first and second communication messages can be transmitted and received.

(Step S107) The filtering setting of the filter processor 120 is cancelled, by which the passage of every communication message or at least the first and second communication messages and their response messages are permitted.

Figure 7:
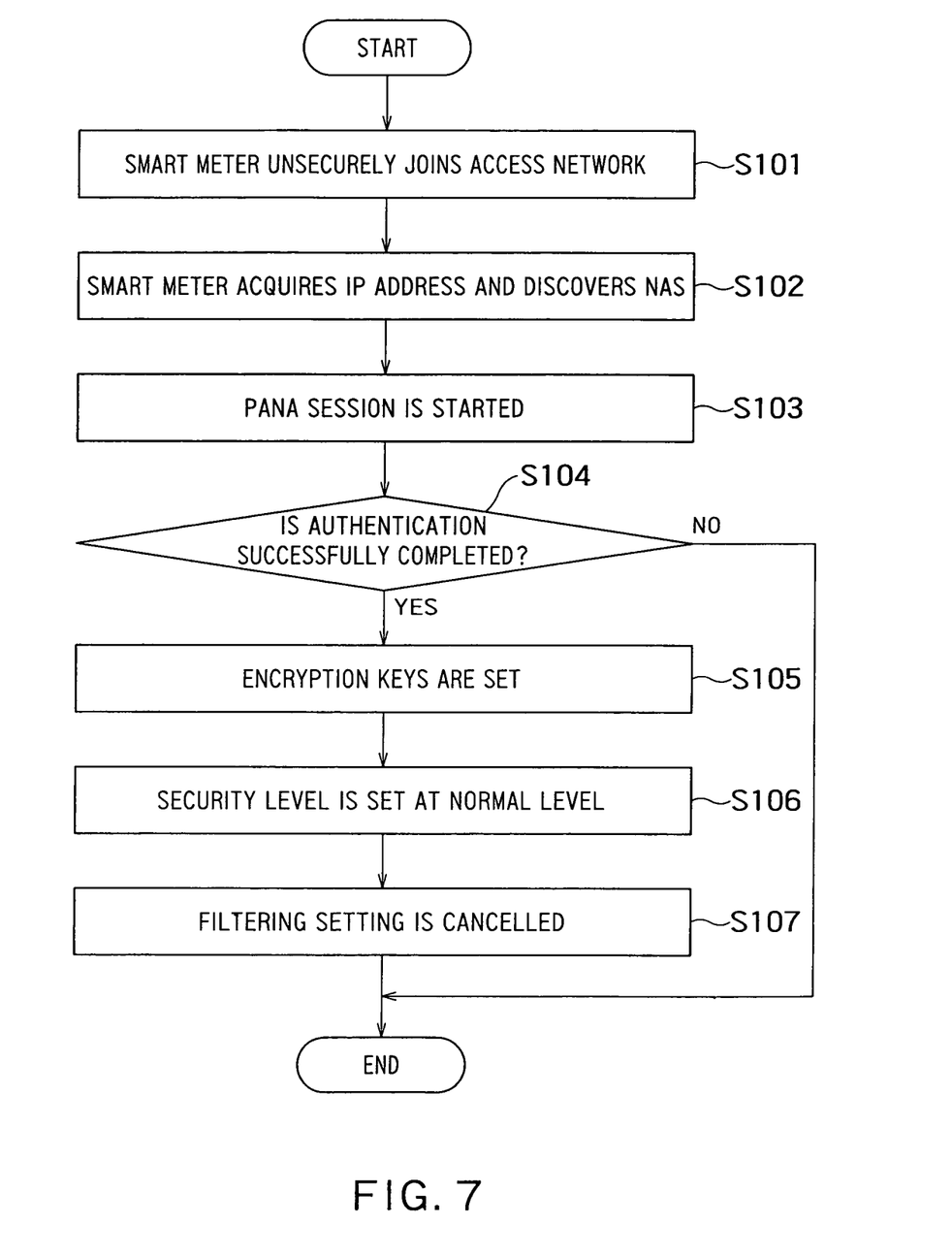
FIG. 7 is a flow chart explaining the authentication steps in the smart meter.

When the IP address is different before and after the authentication, the smart meter 1 can acquire an IP address again after the steps shown in FIG. 7 are performed.

Figure 8:
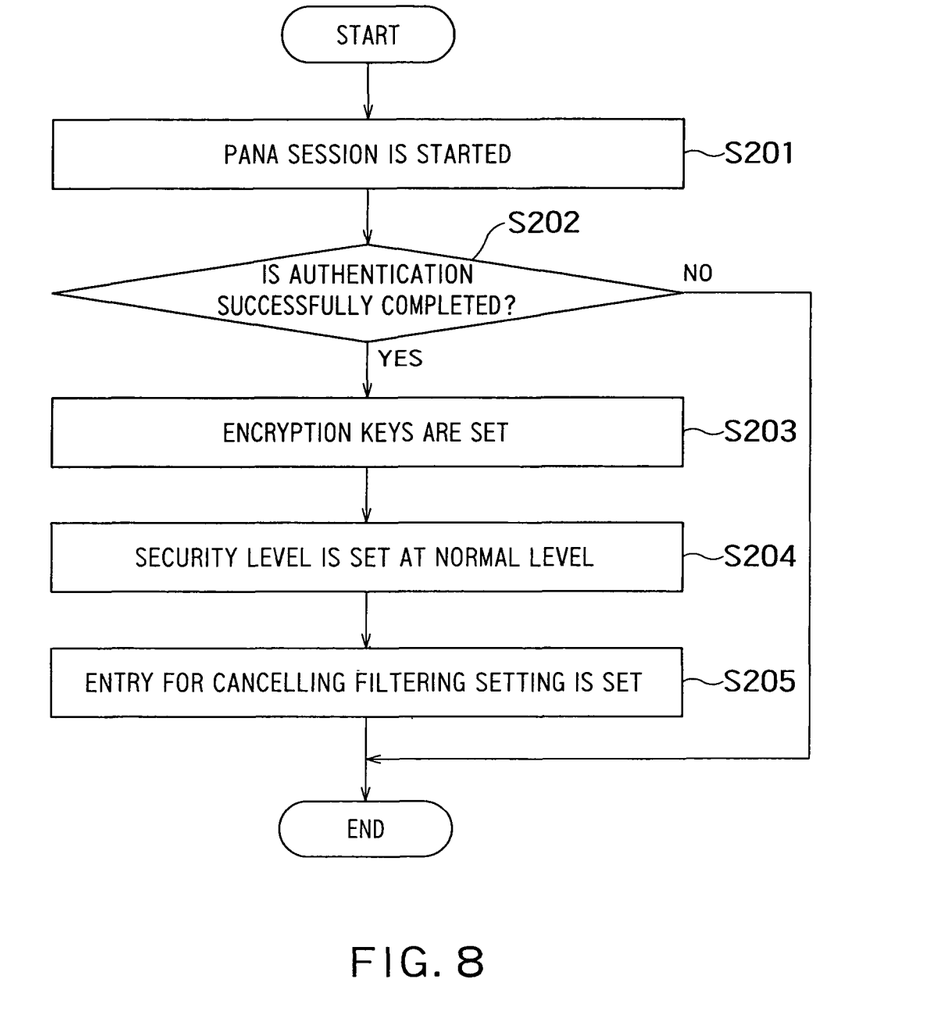
FIG. 8 is a flow chart explaining the operation of a network access server when performing the authentication process of the smart meter.

Next, the operation of the network access server 2 when performing the authentication process of the smart meter 1 will be explained by using the flow chart shown in FIG. 8. When the network access server 2 is started (or restarted), the network access server 2 sets the security level of an IEEE802.15.4 data frame in the EP at a minimum level, and performs filtering setting of an IP packet to permit the passage of only an ARP message, PANA message, DHCP message, and IPv6 Neighbor Discovery message.

(Step S201) A PANA session is started. Concretely, the session is started when the network access server 2 receives a PANA-Client-Initiation message from the smart meter 1 or after the network access server 2 transmits a PANA-Auth-Request message having an ON-state S flag to the smart meter 1.

(Step S202) Whether the authentication by the authentication server 3 is successfully completed is judged. The flow proceeds to Step S203 when the authentication is successfully completed, and proceeds to the end when the authentication process is failed.

(Step S203) The network access server 2 sets an access control parameter in the EP, and notifies that the smart meter 1 is a terminal permitted to connect to the network. Further, the network access server 2 sets the SMK-HH received from the authentication server 3 in the relay adjacent to the smart meter 1.

(Step S204) The network access server 2 sets the security level of an IEEE802.15.4 data frame in the EP at a normal level.

(Step S205) The network access server 2 sets, in the EP, an entry for cancelling the filtering setting of the IP packet to the smart meter 1.

The PANA session established as stated above is kept while the access of the smart meter 1 is accepted, and the smart meter 1 can transmit and receive data packets to and from the external network through the EP.

Figure 9:
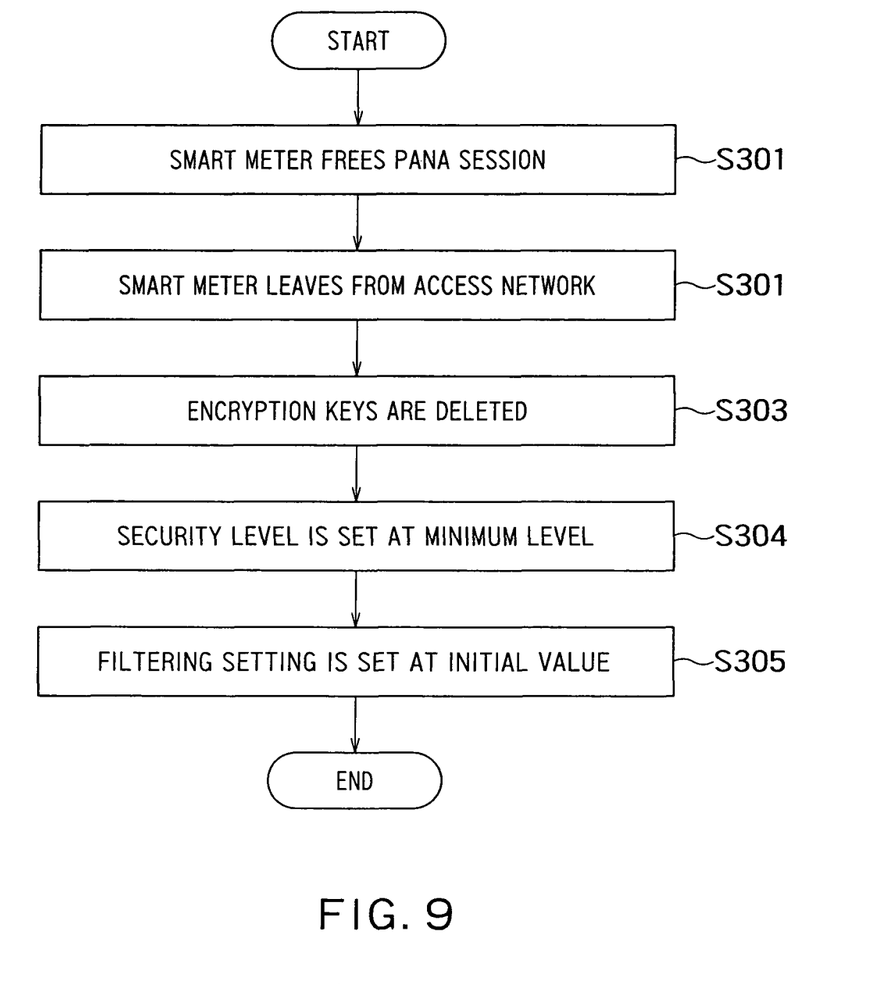
FIG. 9 is a flow chart showing the steps of disconnecting the smart meter from an access network.

Next, the steps of disconnecting the smart meter 1 from the access network 6 will be explained by using the flow chart shown in FIG. 9.

(Step S301) The smart meter 1 frees the PANA session.

(Step S302) The smart meter 1 leaves from the access network 6. Concretely, the smart meter 1 carries out a Disassociation command to the IEEE802.15. device connected to the smart meter 1.

(Step S303) The encryption keys (SMK-EE and SMK-HH) are deleted as explained above by using FIG. 6 (see FIG. 6).

(Step S304) The encryption level (security level) in the encryption processor 114 is set at a minimum level.

(Step S305) The filtering setting in the filter processor 120 is set at an initial value (the passage of only specific messages is permitted).

Figure 10:
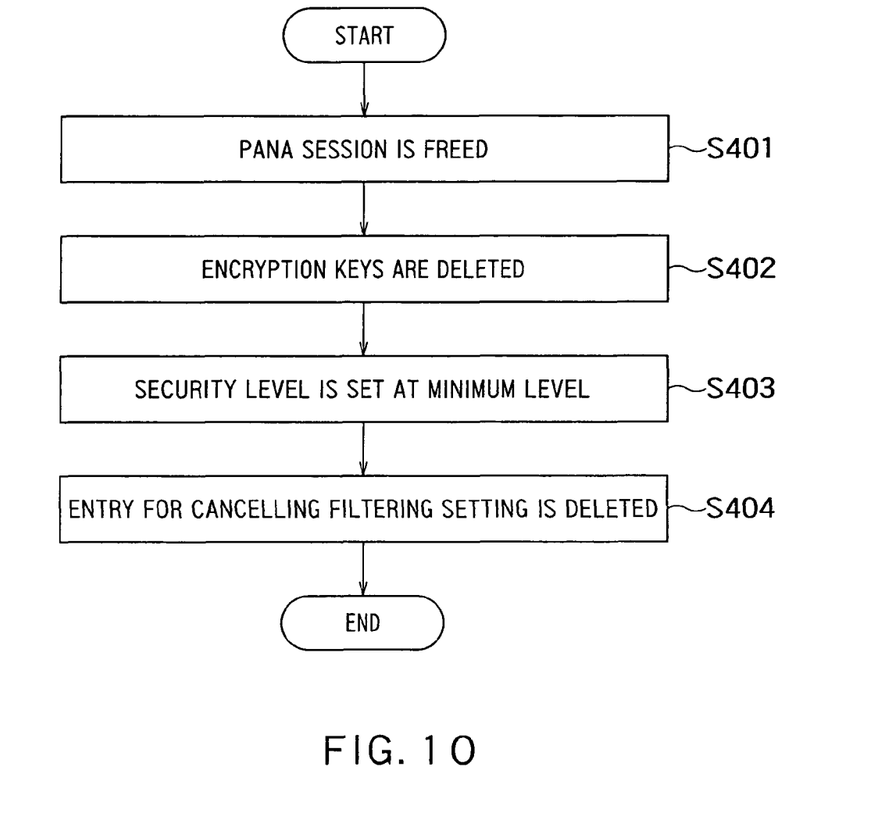
FIG. 10 is a flow chart showing the operation of the network access server when disconnecting the smart meter from the access network.

Next, the operation of the network access server 2 when disconnecting the smart meter 1 from the access network 6 will be explained by using the flow chart shown in FIG. 10.

(Step S401) The PANA session is freed.

(Step S402) The network access server 2 deletes the SMK-EE of the relay connected to the smart meter 1. Further, the network access server 2 deletes, from the EP, the access control parameter for the smart meter 1 accepted until then.

(Step S403) The network access server 2 sets, in the EP, the security level of the data frame to the smart meter 1 at a minimum level.

(Step S404) The network access server 2 deletes, from the EP, an entry for cancelling the filtering setting of the IP packet to the smart meter 1.

As stated above, before the authentication is completed, packet filtering is performed to permit the passage of only specific messages so that unencrypted messages can be transmitted and received. Further, after the authentication is completed, the packet filtering is invalidated so that only encrypted data messages or at least the first and second communication messages can be transmitted and received. Accordingly, security of the IEEE802.15.4 terminal (smart meter 1) using a PANA can be ensured, and common keys (encryption keys) can be set and updated dynamically and safely in the data link layer between the smart meter 1 and the adjacent relay as well as the meter data management server.

As stated above, the smart meter 1 can set and update the encryption keys dynamically and safely. Further, since the PANA is used as an EAP transport protocol on the IEEE802.15.4 network, no change is required for IEEE802.15.4 specifications. Furthermore, the framework of the EAP is used for key management, by which a conventional AAA infrastructure can be used in the authentication of the IEEE802.15.4 terminal and information required for the authentication of the terminal can be managed by the servers in a core network in an integrated fashion.

In the above embodiment, the filter processor 120 and the authentication processor 130 of the smart meter 1 operate in the network layer, but may operate in the data link layer. When the authentication processor 130 transmits and receives authentication messages in the data link layer, the filter processor 120 forbids the passage of data messages under IEEE802.15.4 standard before the authentication is completed and permits the passage of the messages after the authentication is completed.

In this case, the operation of the smart meter 1 and the network access server 2 when the PANA operates on the access network 6 established under IEEE802.15.4 standard is as shown in the flow charts of FIG. 7 to FIG. 10. Note that the acquisition of an IP address in Step S102 can be omitted. When the smart meter 1 supports the IP, an IP address can be acquired after the authentication steps are completed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An encryption information transmitting terminal for communicating with a destination device through a network connection comprising:
    a communication unit configured to transmit and receive a communication message;
    an authentication processor configured to perform an authentication process for establishing the network connection by transmitting and receiving an authentication message to and from an authentication server through the communication unit;
    a first message generator configured to generate a first communication message to the destination device, which includes an acquisition instruction of an SMK-EE (Smart Meter Key for End-to-End protection) from the authentication server; and
    a second message generator configured to generate a second communication message including data for the destination device,
    wherein the communication unit encrypts the first communication message with an SMK-HH (Smart Meter Key for hop by hop protection), transmits an encrypted first communication message to the destination device, encrypts the second communication message with the SMK-EE, and transmits an encrypted second communication message to the destination device, wherein the first communication message and the encrypted second communication message are transferred to the destination device through a relay, and wherein, when the authentication process is successfully completed, an EMSK (Extended Master Session Key) is generated according to a key generation algorithm given in advance and the SMK-EE and the SMK-HH are generated by using the EMSK as a master key.

2. The terminal according to claim 1, wherein the first communication message is a routing information registration message based on ANSI C 12.22.

3. The terminal according to claim 2, wherein the authentication process is performed through a network access server having an authenticator function between the authentication processor and the authentication server, and the network access server and the relay are incorporated into same device.

4. The terminal according to claim 1, further comprising:

a filter processor configured to perform filtering on a message to pass through the communication unit; and a controller configured to control operation of the filter processor, wherein the controller controls the filter processor so that the filter processor passes only a predetermined communication message required for the authentication process before the authentication process is successfully completed, and passes the first and second communication messages after the authentication process is successfully completed.

5. An encryption information transmitting terminal for communicating with a destination device through a network connection, comprising:

a communication unit configured to transmit and receive a communication message;

an authentication processor configured to perform an authentication process for establishing the network connection by transmitting and receiving an authentication message to and from an authentication server through the communication unit;

a first message generator configured to generate a first communication message to the destination device, which includes an acquisition instruction of an SMK-EE (Smart Meter Key for End-to-End protection) from the authentication server; and a second message generator configured to generate a second communication message including data for the destination device, wherein the communication unit encrypts the first communication message with an SMK-HH (Smart Meter Key for hop by hop protection), transmits an encrypted first communication message to the destination device, encrypts the second communication message with the SMK-EE, and transmits an encrypted second communication message to the destination device, wherein the first communication message and the encrypted second communication message are transferred to the destination device via a relay, wherein when the authentication process is successfully completed, an EMSK (Extended Master Session Key) is generated according to a key generation algorithm given in advance and the SMK-EE and the SMK-HH are generated by using the EMSK as a master key, wherein the relay includes an EP (Enforcement Point) carrying out access control on a packet basis over the encryption information transmitting terminal, wherein the relay sets the EP to pass a message between the encryption information transmitting terminal and the authentication server and block a message between the encryption information transmitting terminal and the destination device before the authentication process is successfully completed, and wherein the relay sets the EP to pass the message between the encryption information transmitting terminal and the destination device after the authentication process is successfully completed.

6. A network system comprising an encryption information transmitting terminal and a relay, wherein the encryption information transmitting terminal comprises a communication unit configured to transmit and receive a communication message;

an authentication processor configured to perform an authentication process for establishing a network connection by transmitting and receiving an authentication message to and from an authentication server through the communication unit;

a first message generator configured to generate a first communication message to the destination device, which includes an acquisition instruction of an SMK-EE (Smart Meter Key for End-to-End protection) from the authentication server; and a second message generator configured to generate a second communication message including data for the destination device, wherein the communication unit encrypts the first communication message with an SMK-HH (Smart Meter Key for hop by hop protection), transmits an encrypted first communication message to the destination device, encrypts the second communication message with the SMK-EE, and transmits an encrypted second communication message to the destination device, wherein the first communication message and the encrypted second communication message are transferred to the destination device through a relay, wherein when the authentication process is successfully completed, an EMSK (Extended Master Session Key) is generated according to a key generation algorithm given in advance and the SMK-EE and the SMK-HH are generated by using the EMSK as a master key, wherein the relay has the SMK-HH, decodes the encrypted first communication message to obtain the first communication message and transfers the first communication message and the encrypted second communication message to the destination device, wherein the relay includes an EP (Enforcement Point) carrying out access control on a packet basis over the encryption information transmitting terminal, wherein the relay sets the EP to pass a message between the encryption information transmitting terminal and the authentication server and block a message between the encryption information transmitting terminal and the destination device before the authentication process is successfully completed, and wherein the relay sets the EP to pass the message between the encryption information transmitting terminal and the destination device after the authentication process is successfully completed.

* * * * *